(12) United States Patent
Krull et al.

(10) Patent No.: US 9,717,360 B2
(45) Date of Patent: Aug. 1, 2017

(54) ORGANIZATIONAL STORAGE METHODS AND APPARATUS

(71) Applicants: Mark Krull, New Braunfels, TX (US); Darrin Swagel, St. Louis Park, MN (US)

(72) Inventors: Mark Krull, New Braunfels, TX (US); Darrin Swagel, St. Louis Park, MN (US)

( * ) Notice: Subject to any disclaimer, the term of this patent is extended or adjusted under 35 U.S.C. 154(b) by 0 days.

(21) Appl. No.: 14/819,660

(22) Filed: Aug. 6, 2015

(65) Prior Publication Data

US 2016/0135634 A1 May 19, 2016

Related U.S. Application Data

(63) Continuation-in-part of application No. 14/543,851, filed on Nov. 17, 2014, now Pat. No. 9,107,527, which is a continuation of application No. 13/593,915, filed on Aug. 24, 2012.

(60) Provisional application No. 61/575,608, filed on Aug. 24, 2011, provisional application No. 62/168,939, filed on Jun. 1, 2015.

(51) Int. Cl.
*A47J 47/16* (2006.01)
*A47B 73/00* (2006.01)
*A47G 29/14* (2006.01)
*A47G 29/08* (2006.01)
*F16M 13/02* (2006.01)

(52) U.S. Cl.
CPC ............ *A47G 29/14* (2013.01); *A47B 73/008* (2013.01); *A47G 29/08* (2013.01); *A47J 47/16* (2013.01); *F16M 13/022* (2013.01); *Y10T 29/49826* (2015.01)

(58) Field of Classification Search
CPC ......... A47J 47/00; A47G 29/08; A47G 29/14; A47B 73/008
USPC ...... 211/60.1, 62, 63, 65, 66, 69, 69.1, 69.8, 211/70, 70.3, 70.6, 70.7, 74, 75, 76, 77, 211/78, 85.18, 95, 115, 129.1, 131.1, 144, 211/163; 108/94, 103, 139, 149; 141/165; 198/470.1, 478.1; 248/230.1, 248/230.7, 309.1, 312, 316.7; 312/125, 312/135, 305, 334.23; D6/322
See application file for complete search history.

(56) References Cited

U.S. PATENT DOCUMENTS 551,459 A * 12/1895 Walker et al. ......... A47G 25/12
211/63
560,447 A * 5/1896 Voege ................ A47B 96/1425
211/107
634,526 A * 10/1899 Holmes .................. A47G 25/12
211/63

(Continued)

*Primary Examiner* — Joshua Rodden

(57) ABSTRACT

A support structure is mounted beneath a shelf in a manner that defines a vertical axis, and a rack or wheel is mounted on the support structure for rotation relative to the support structure. Containers resiliently snap into circumferentially spaced C-shaped clips defined by the rack. On various embodiments, the support structure includes intermediate components that accommodate sliding and/or pivoting of the rack relative to the shelf, and/or a user may selectively remove the rack from the support structure. When the rack is mounted on the support structure, a user may rotate the rack relative to the support structure to alternatively rotate the containers to a forwardmost position relative to the shelf.

19 Claims, 17 Drawing Sheets

(56) References Cited

U.S. PATENT DOCUMENTS

| | | | | |
|---|---|---|---|---|
| 874,933 A * | 12/1907 | Bristow | ............... | A47B 49/004 211/166 |
| 938,809 A * | 11/1909 | Alexander et al. | | G11B 33/0483 211/163 |
| 1,400,145 A * | 12/1921 | Duncan | ................... | A47B 77/16 211/77 |
| 1,759,140 A * | 5/1930 | Silberger | ................ | A47J 47/16 211/163 |
| 1,864,039 A * | 6/1932 | Brownson | ................ | A47J 47/16 211/113 |
| 1,910,091 A * | 5/1933 | Collier | ................ | A24F 19/0092 108/26 |
| 2,046,229 A * | 6/1936 | Woda | ................. | A47G 25/746 211/104 |
| 2,431,837 A * | 12/1947 | Spotts | ................... | A47G 23/08 211/77 |
| 2,754,166 A * | 7/1956 | Ohm | ...................... | A47G 23/08 211/115 |
| 3,624,732 A * | 11/1971 | Bowden | ................... | A45B 3/00 108/151 |
| 4,334,623 A * | 6/1982 | Geary | ................ | A47G 23/0208 211/131.1 |
| 5,772,050 A * | 6/1998 | Shih | ......................... | B41K 1/58 211/163 |
| 6,308,838 B1 * | 10/2001 | Endean | ..................... | A47F 7/08 211/205 |
| 6,626,305 B2 * | 9/2003 | Domenig | ............... | A47B 57/26 211/129.1 |
| 8,186,524 B2 * | 5/2012 | Siahpush | .................. | A47F 5/02 211/133.4 |
| 8,517,323 B1 * | 8/2013 | Gregory | ................... | A47J 47/16 108/26 |
| 2004/0104188 A1 * | 6/2004 | Russell | .................. | A47B 49/00 211/78 |
| 2005/0194873 A1 * | 9/2005 | Hoffman | .............. | A47B 49/006 312/305 |
| 2010/0089848 A1 * | 4/2010 | Thompson | .............. | A47J 47/16 211/77 |

\* cited by examiner

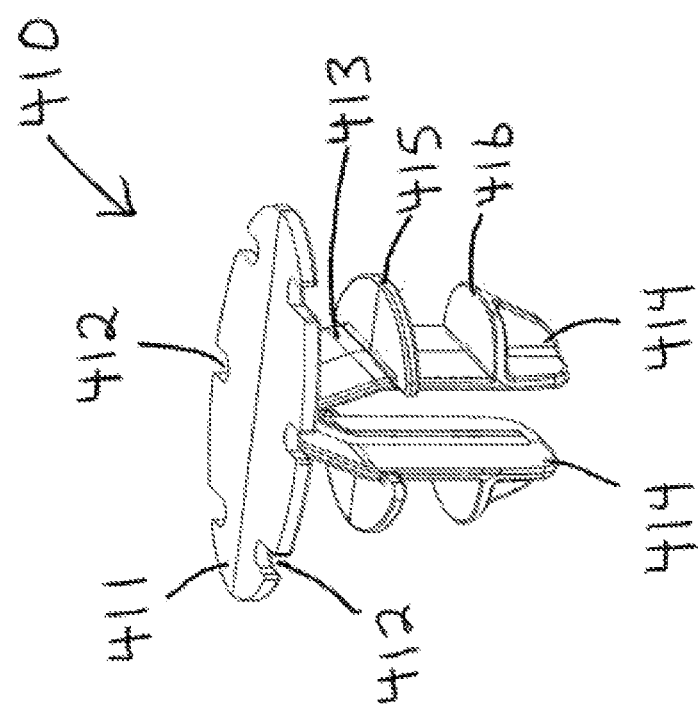

US 9,717,360 B2

ORGANIZATIONAL STORAGE METHODS AND APPARATUS

CROSS-REFERENCE TO RELATED APPLICATION

This is (1) a continuation-in-part of U.S. patent application Ser. No. 14/543,851, filed Nov. 17, 2014 (U.S. Pat. No. 9,107,527), which is (a) a continuation of U.S. patent application Ser. No. 13/593,915, filed Aug. 24, 2012 (U.S. Pat. No. 8,887,930), and (b) discloses subject matter entitled to the filing date of U.S. Provisional Application No. 61/575,608, filed Aug. 24, 2011; and (2) discloses subject matter entitled to the filing date of U.S. Provisional Application No. 62/168,939, filed Jun. 1, 2015.

FIELD OF THE INVENTION

The present invention relates to methods and apparatus for storing items in organized fashion, and in a preferred application, to the storage of kitchen spice jars.

BACKGROUND OF THE INVENTION

Past efforts have led to various inventions directed toward the storage of household items, including, for example, kitchen spice jars. Despite various advances in the art, room for continued improvement remains. An object of the present invention is to provide a new and useful storage system.

SUMMARY OF THE INVENTION

The invention provides a storage rack or wheel that mounts beneath a cabinet or shelf or other structural support. On one embodiment, the rack releasably snaps onto and off of support structure that defines a vertical axis relative to the structural support, and the rack preferably rotates to provide equal access to each of a plurality of containers releasably stored about its circumference.

In one respect, the invention may be described as a storage apparatus comprising a support structure having a first end configured and arranged to mount beneath a shelf in a manner that defines a vertical axis, and an opposite, second end; and a rack having a central portion and circumferentially spaced container holders disposed about the central portion, wherein at least one of the rack and the support structure resiliently deflects to accommodate mounting and dismounting of the central portion of the rack relative to the second end of the support structure.

On a preferred embodiment, the second end of the support structure includes first and second prongs that are diametrically disposed relative to the vertical axis, and a centrally located hole extends through the central portion of the rack. The prongs occupy the hole to releasably mount the rack on the support structure, and the prongs resiliently deflect (a) toward one another to accommodate passage through the hole and (b) away from one another to resist passage through the hole.

In another respect, the invention may be described as a storage method comprising the steps of providing a storage apparatus for items disposed inside respective containers having upper lid portions and lower jar portions, for use beneath a shelf, wherein the storage system includes a support structure and a rack; mounting the support structure to a downwardly facing surface defined by the shelf; positioning the containers in respective dedicated locations defined by the rack; and resiliently mounting the rack onto the support structure in such a manner that at least one of the rack and the support structure resiliently deflects to accommodate mounting and dismounting of the rack relative to the support structure.

Many features and/or advantages of the present invention will become apparent from the more detailed description that follows.

BRIEF DESCRIPTION OF THE FIGURES OF THE DRAWING

With reference to the Figures of the Drawing, wherein like numerals represent like components throughout the several views.

FIG. 17 is a perspective view of a support structure component of the storage apparatus of FIG. 14.

DETAILED DESCRIPTION OF A PREFERRED EMBODIMENT

Figure 1:
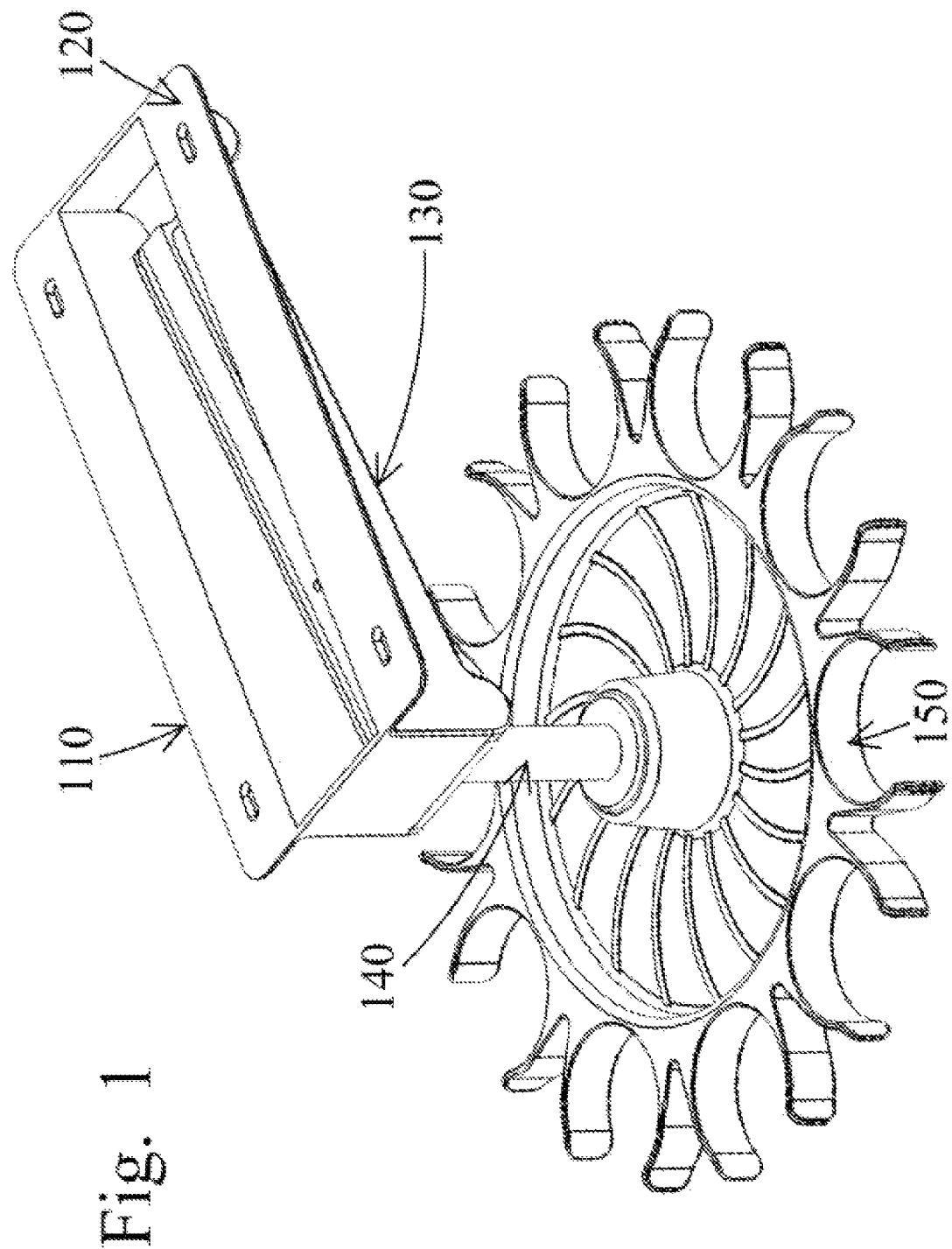
FIG. 1 is a perspective view of components of a first storage system constructed according to the principles of the present invention.
Figure 2:
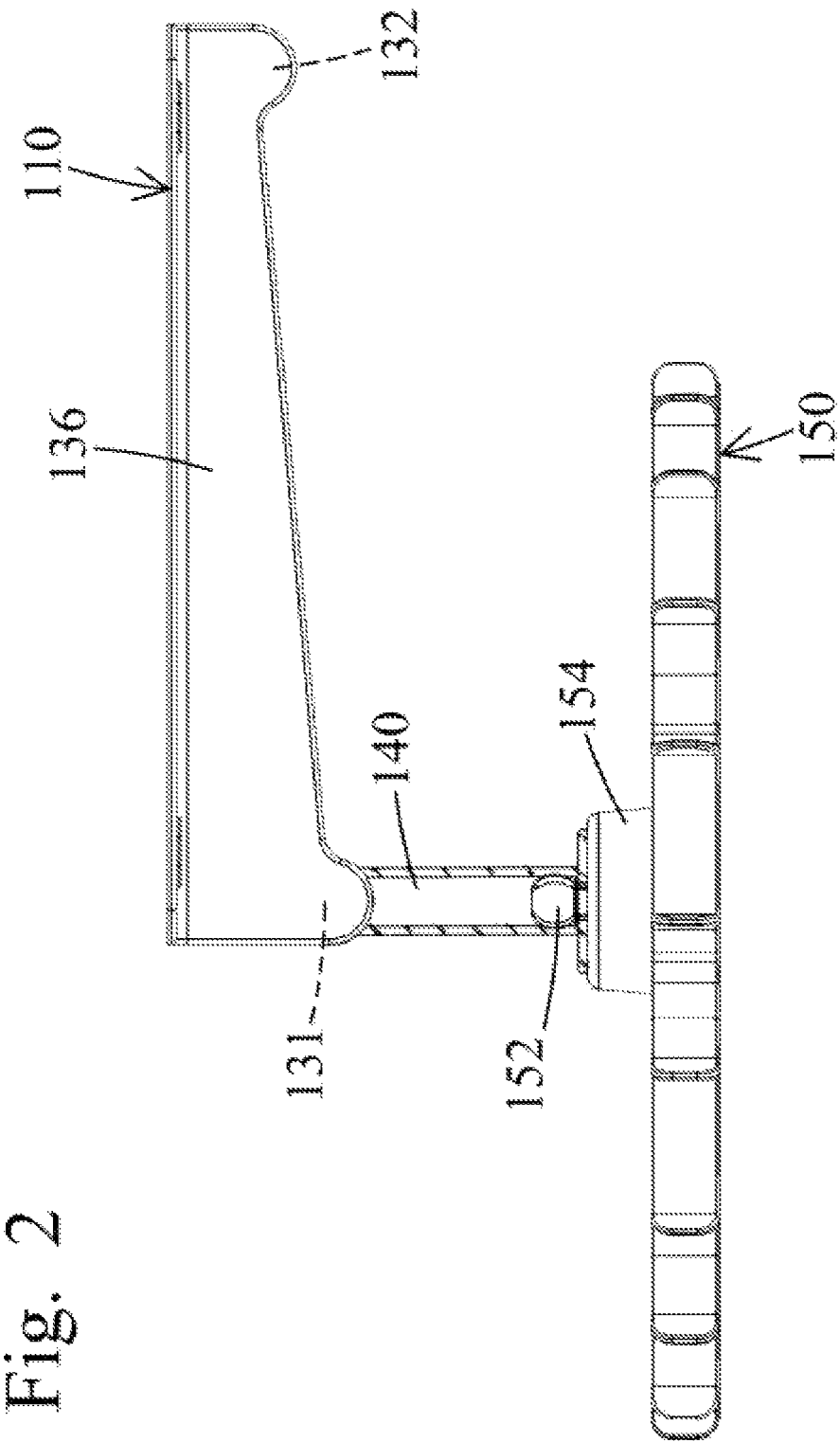
FIG. 2 is a partially sectioned side view of the storage system components of FIG. 1.

FIGS. 1-4 show components of a first storage system constructed according to the principles of the present invention. The depicted components include a bracket 110 having a first portion that defines a base 120; and a second portion that defines a track 130, an axle 140, and a rack, carousel, or wheel 150. Each of these three components is preferably a separate, injected molded plastic part that is manufactured using a relatively simple two-piece mold and a single direction of pull. However, persons skilled in the art will recognize that the axle and carousel components may be integrally formed as a unitary part, with some modifications, on alternative embodiments of the subject invention.

The base portion 120 of the bracket 110 includes opposite left and right flanges 121 and 122 having respective top and bottom surfaces that are bounded by common first and second parallel planes. In other words, the top surfaces of the flanges 121 and 122 are configured and arranged to rest flush against a flat surface, such as the downwardly facing side of a horizontal board. The depicted left flange 121 extends along the entire length of the left side of the bracket 110, and the depicted right flange extends along the entire length of the right side of the bracket 110. Holes 129 extend through respective flanges 121 and 122 near each of the four corners of the bracket 110 to accommodate insertion of the shafts of fasteners, such as conventional wood screws, for example, but resist passage of the heads of those fasteners. In other words, conventional wood screws (not shown) may be inserted into the holes 129 from the bottom side of flanges 121 and 122 and then threaded into an overlying board in order to rigidly secure the bracket 110 to the board. Persons skilled in the art will recognize that alternative known fastening means, including adhesive tape, for example, may be used in lieu of and/or in addition to wood screws for purposes of fastening the flanges 121 and 122 to an overlying board. Moreover, persons skilled in the art will recognize that alternative base arrangements may be used in lieu of and/or in addition to the flanges 121 and 122 in order to accommodate various types of known fastening means for purposes of fastening alternative embodiment brackets to an overlying board.

Figure 3:
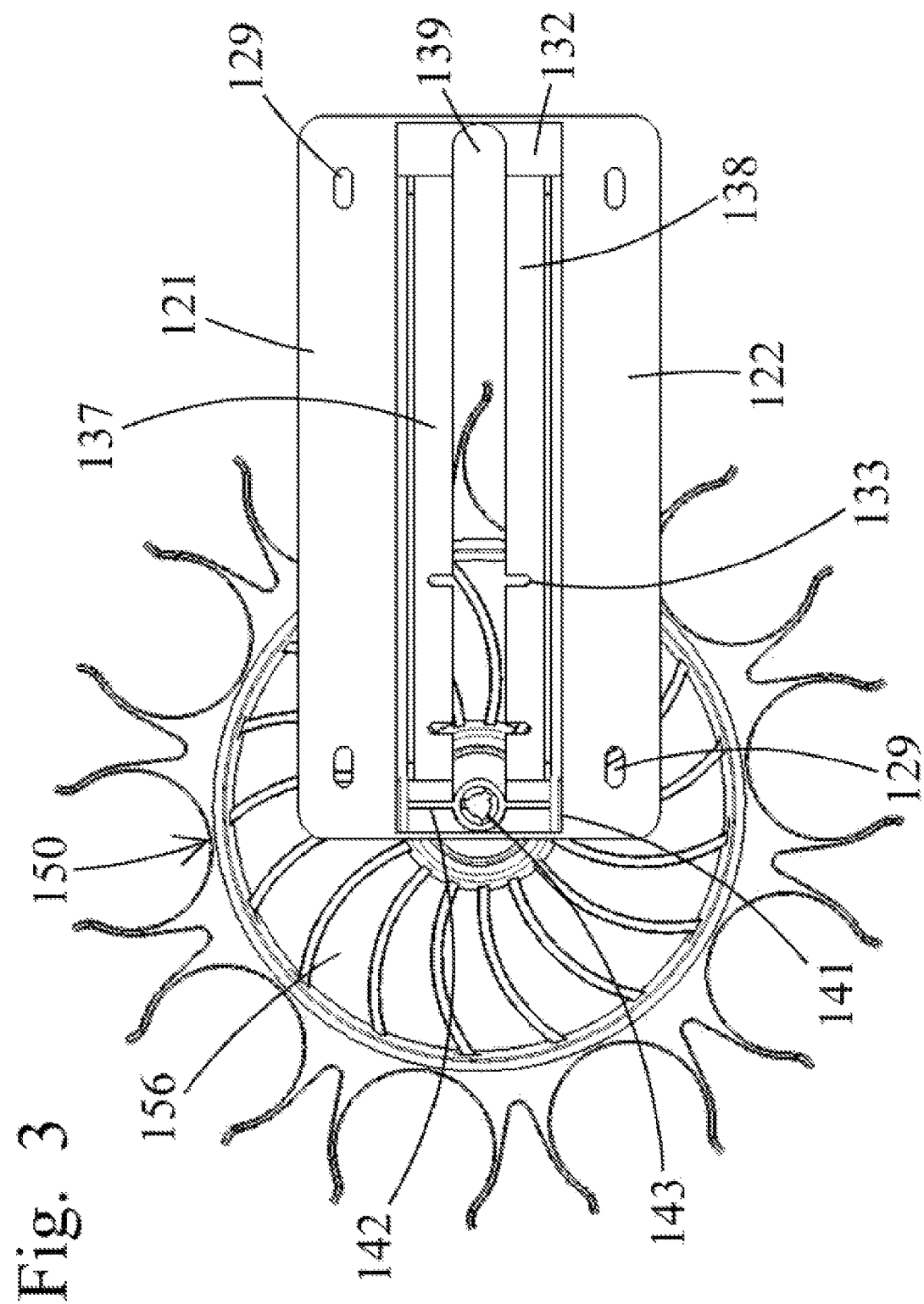
FIG. 3 is a top view of the storage system components of FIG. 1.
Figure 4:
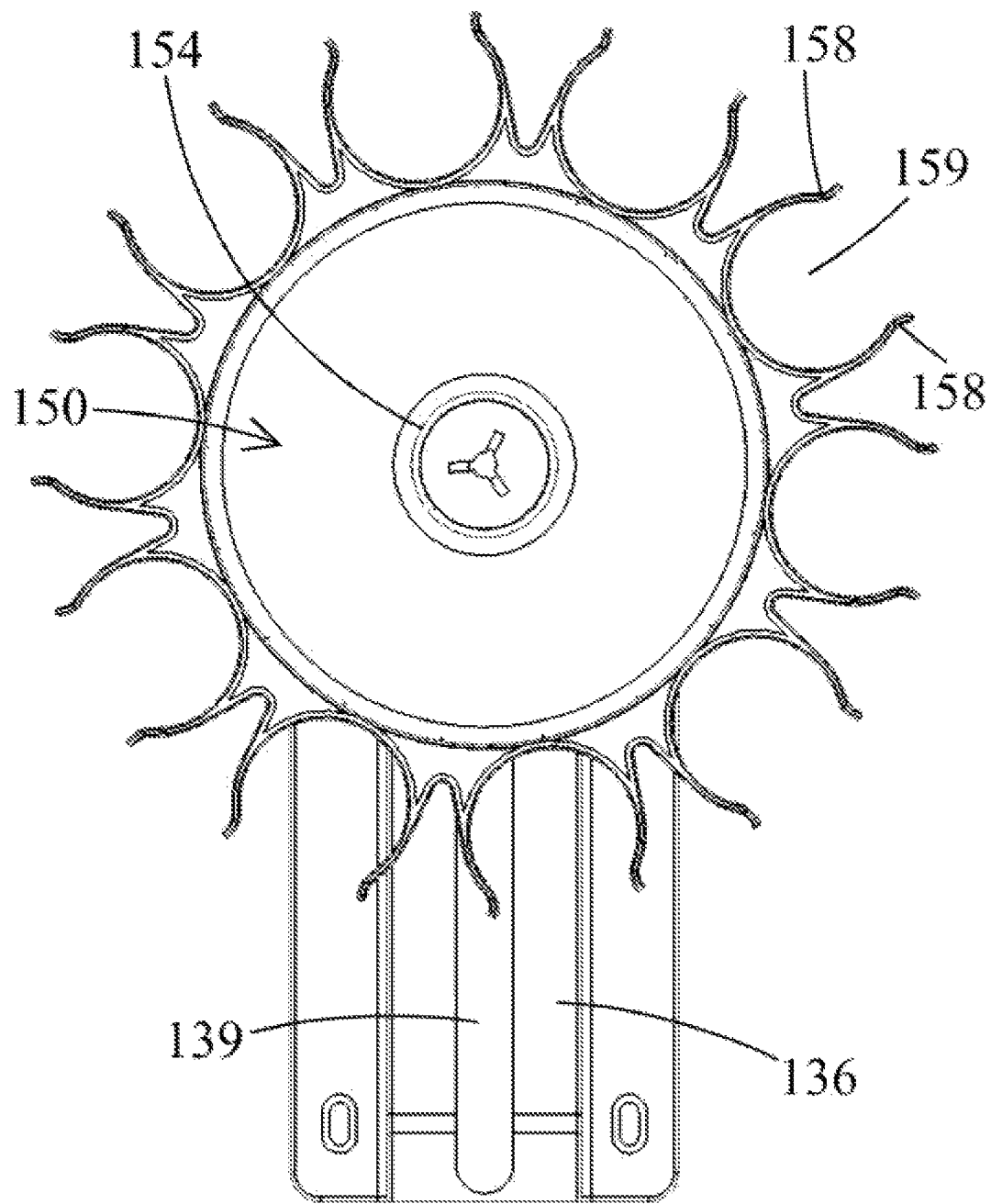
FIG. 4 is a bottom view of the storage system components of FIG. 1.

The track portion 130 of the bracket 110 is defined by a box-like structure or shell 136 that projects vertically downward from the flanges 121 and 122. As shown in FIG. 3, the bottom of the shell 136 is defined by parallel left and right rails 137 and 138 separated by an elongate slot 139 disposed therebetween and extending parallel thereto. The rails 137 and 138 and the slot 139 defined therebetween are inclined relative to the flanges 121 and 122. On the depicted embodiment, the angle of inclination is approximately five degrees, as can be measured in FIG. 2. With reference back to FIG. 3, first and second dips or recesses 131 and 132 are defined at opposite, first and second ends of the rails 137 and 138. As suggested in FIG. 2, the profile of each recess 131 and 132 is generally semi-circular. As shown in FIG. 3, the slot 139 extends into each recess 131 and 132 and then terminates proximate respective front and rear end walls of the shell 136. Also, two pairs of opposing notches 133 extend laterally into the opposing sides of the rails 131 and 132 for reasons further discussed below.

The axle 140 has a lower end sized and configured to rotatably interconnect with the carousel 150 (as further described below); an upper end 143 (see FIG. 3) sized and configured to travel along the track portion 130 of the bracket 110; and a generally cylindrical intermediate portion or tubular shaft extending therebetween. The intermediate portion of the axle 140 is sized and configured for insertion through the slot 139 and for passage along the slot 139.

As shown in FIG. 3, the upper end 143 of the axle 140 includes left and right tabs 142 that project radially outward from diametrically opposed sides of the central shaft. Left and right discs 141 are disposed on the distal ends of respective tabs 142 and extend orthogonally relative thereto. The distance between the discs 141 is equal to the distance between the notches 133 in the shell 136. As a result, prior to installation of the bracket 110, the upper end 143 of the axle 140 is rotated ninety degrees (relative to the orientation shown in FIG. 3) and then inserted upward through the slot 139 from a starting position beneath the rails 137 and 138. After sliding the upper end 143 toward the opposite end of the slot 139, the upper end 143 is rotated ninety degrees and nestled between the left and right sidewalls of the shell 136, with the left and right discs 141 resting on respective rails 137 and 138 and between opposite sidewalls of the shell 136 (as shown in FIG. 3).

Figure 5:
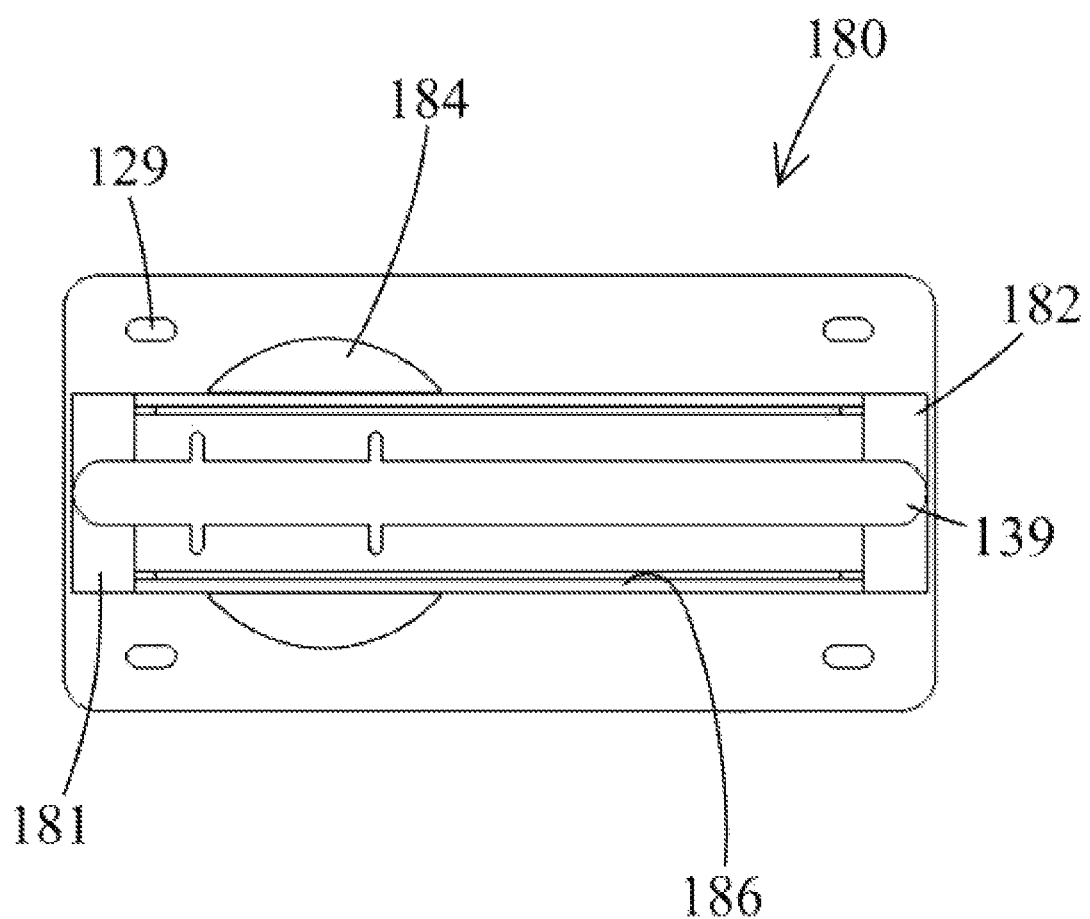
FIG. 5 is a top view of an alternative embodiment bracket that may be substituted for one of the storage system components of FIG. 1.

Persons skilled in the art will recognize that various changes may be made to the upper end of the axle and/or the method in which it is installed relative to the bracket, without departing from the scope of the present invention. For example, FIG. 5 shows an alternative embodiment bracket 180 suitable for use together with an alternative embodiment axle (not shown). The alternative embodiment axle is identical to the axle 140 except that the tabs 142 and the discs 141 are replaced by left and rights bars having a squared U-shaped profile. The bars similarly project radially outward from diametrically opposed sides of the central shaft. When properly oriented, the bars are sized and configured to slide upward through the slot 139 from a starting position beneath the rails 137 and 138 on the modified bracket 180.

The alternative embodiment bracket 180 is identical to the bracket 110 except as noted herein. Diametrically opposed sections of a cylindrical well or recess 184 project downward through an upper portion of the shell 186 of the bracket 180 to accommodate rotation of the modified axle after the bars are inserted through the slot 139. On this alternative embodiment, the bars may be inserted through the slot 139 before or after installation of the bracket 180. In other words, on this alternative embodiment, the axle and associated carousel may be selectively removed from the installed bracket 180 (by pushing upward on the carousel and axle; locating the bars within the well segments 184; rotating the components ninety degrees, and guiding the bars downward through the slot 139).

As on the bracket 110, the ends of the track defined by the alternative embodiment bracket 180 terminate in dips or recesses 181 and 182. However, as suggested by the distinct reference numerals, the recesses 181 and 182 have a square profile to accommodate the squared profile of the U-shaped bars on the alternative embodiment axle (rather than the semi-circular profile of the recesses 131 and 132 on the bracket 110). As a result, the alternative embodiment axle is braced against pivoting relative to the bracket 180, whereas the axle 140 is capable of pivoting about a horizontal axis relative to the bracket 100.

The carousel 150 includes a centrally located hub 154; a donut-shaped tray 156 projecting radially outward from all sides of the hub 154; and ten circumferentially spaced pairs of opposing leaf springs 158 projecting outward from the circumference of the tray 156. The tray 156 is reinforced by arcuate, circumferentially distributed ribs that extend from the hub 154 to a rimmed outer edge of the tray 156. As shown in FIGS. 6-9, the tray 156 is sized and configured to accommodate a circular array of six conventional spice jars 80.

The hub 154 is a downwardly opening, generally cylindrical shell. Leaf springs 152 (see FIG. 2) extend upward from the top of the hub 154 and snap fit through a relatively narrower diameter hole in the lower end of the axle 140 to rotatable connect the carousel 150 to the axle 140. Persons skilled in the art will recognize that other arrangements may be made for connecting the carousel 150 to the axle 140. For example, leaf springs may be provided on the lower end of the axle and snap fit through a relative smaller diameter opening in the hub, in which case the ends of the leaf springs may have catches that engage an edge on the hub to discourage inward deflection of the leaf springs in response to downward force on the carousel. Various alternative embodiment leaf springs on the axle may insert axially through an opening in the top of the hub, or radially through an opening in a sidewall of the hub. On another alternative embodiment, a conventional threaded nut may be press-fit into the lower end 140 of the axle, and a conventional bolt may be inserted upward through the bottom of the hub and threaded into the nut (with a stand-off to prevent clamping of the carousel to the axle). On yet another alternative embodiment, a conventional bolt may extend through the hub and a majority of the axle, and thread into a conventional nut keyed into the top of the axle.

Each pair of leaf springs 158 defines a resilient, C-shaped spring clip or receptacle 159 that opens radially outward from the hub 154. As shown in FIGS. 6-9, ten of the receptacles 159 are configured and arranged to accommodate a circular array of ten conventional spice jars 80 distributed about the circumference of the tray 156. Among other things, upwardly opening bins or cups may be designed to snap into the receptacles 159 in lieu of one or more of the spice jars 80. Persons skilled in the art will also recognize that alternative embodiments of the subject invention may be provided with other sorts of receptacles for the spice jars 80 or for other containers. For example, leaf spring clips may be arranged to act upon relatively more elongate containers that extend horizontally rather than vertically. On still other alternative embodiments, the receptacles may be configured as cups having sidewalls and a bottom wall, as opposed to leaf springs.

FIGS. 6-9 show the components of FIGS. 1-4 installed beneath an otherwise conventional kitchen cabinet 90 to define an installed storage system 100. The cabinet 90 includes a bottom shelf or board 99 (see FIG. 11) that extends horizontally across the bottom of the cabinet 90, and is bounded by top and bottom horizontal planes. Conventional wood screws (not shown) are inserted through the holes 129 in the bracket 110 and threaded into the bottom of the board 99, to fasten the bracket 110 thereto. FIGS. 6-9 also show sixteen conventional spice jars 80 loaded onto the carousel. Each spice jar 80 is a plastic, upwardly opening cylinder and is capped with a screw-on lid 88. Persons skilled in the art will recognize that the spice jars may be made of different materials and/or in various sizes without departing from the scope of the present invention. Moreover, similar containers may be used to hold various types of contents, including, for example, beads, hardware, office supplies, and pills.

Provisions also may be made to accommodate containers of various diameters. For example, secondary leaf springs may be incorporated into the existing leaf springs to define a smaller gap therebetween. A smaller diameter jar would snap into engagement with the secondary leaf springs. A larger diameter jar would deflect the secondary leaf springs and snap into engagement with the primary leaf springs (without unduly straining the second leaf springs because they would deflect together with the primary leaf springs). Another possibility is to fit the existing leaf springs with add-on pads that reduce the gap therebetween and/or to fit the smaller diameter jars with collars or rings that enlarge the effective diameter of the jars. Yet another possibility is to add ribs on the leaf springs that snap into place between the lid portions and underlying jar portions of respective containers.

Figure 6:
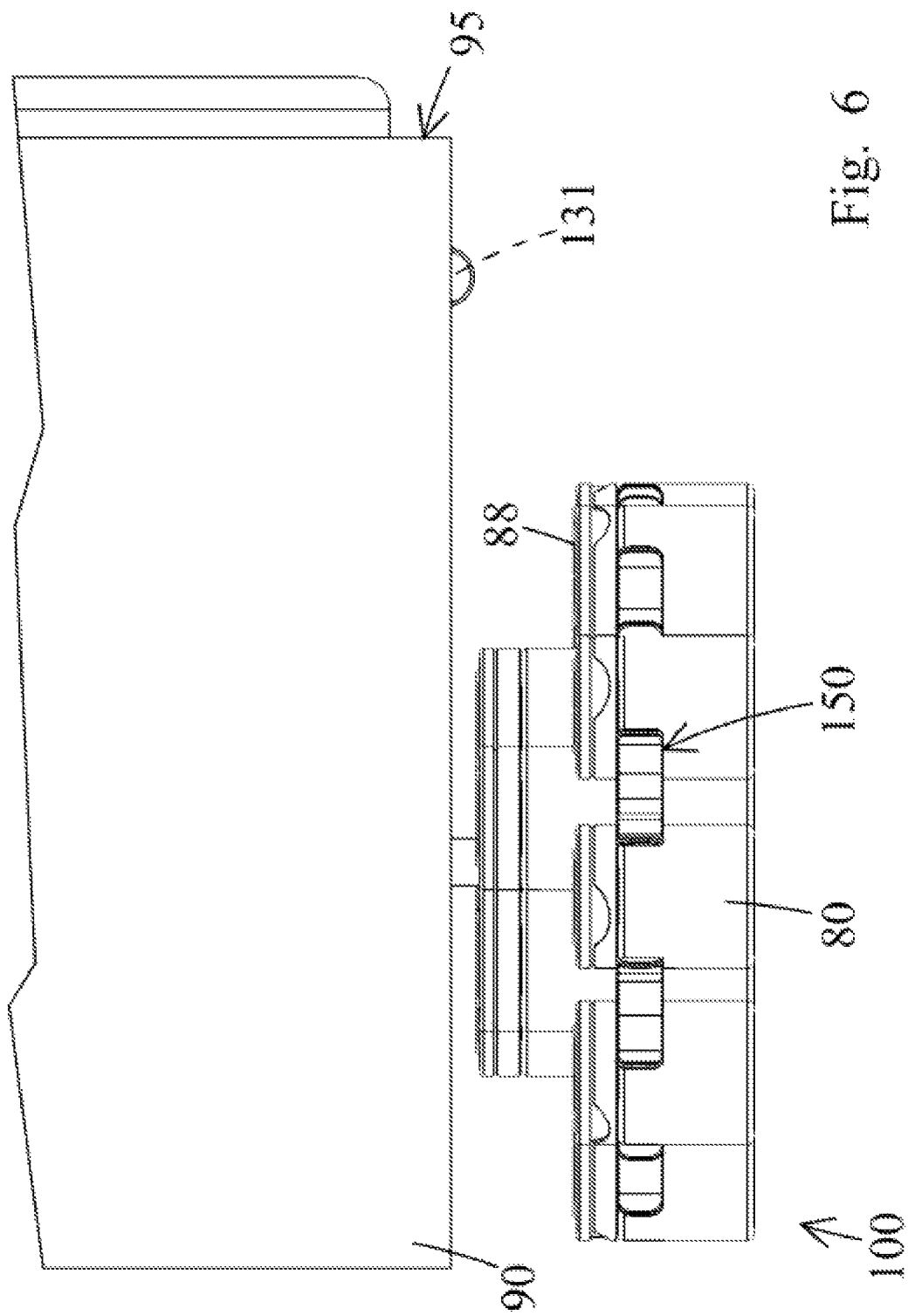
FIG. 6 is a side view of the storage system components of FIG. 1 laden with kitchen spice jars, secured to the bottom side of a wall cabinet, and occupying a stowed configuration relative to the cabinet.
Figure 7:
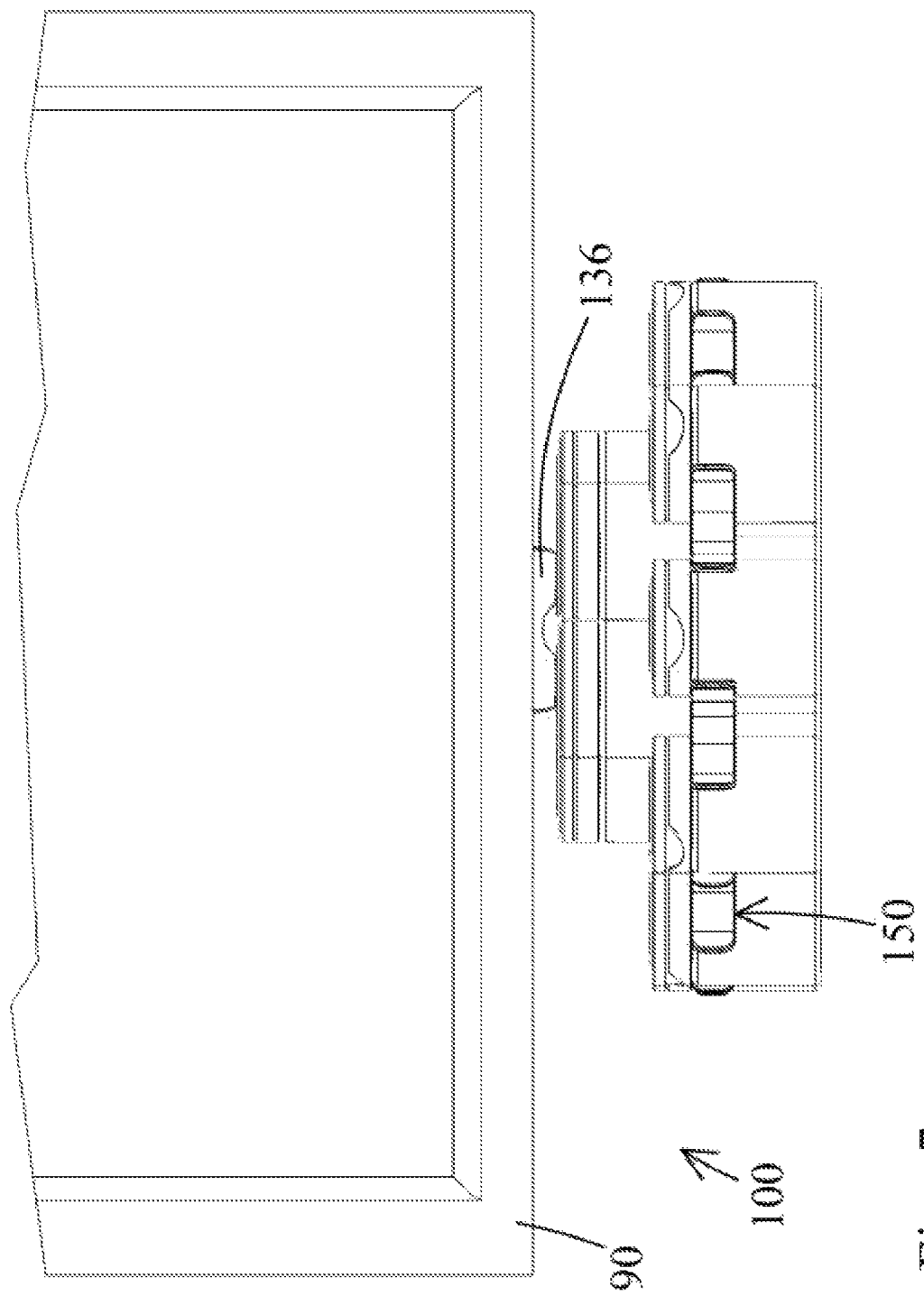
FIG. 7 is a front view of the laden and stowed storage system of FIG. 6.
Figure 8:
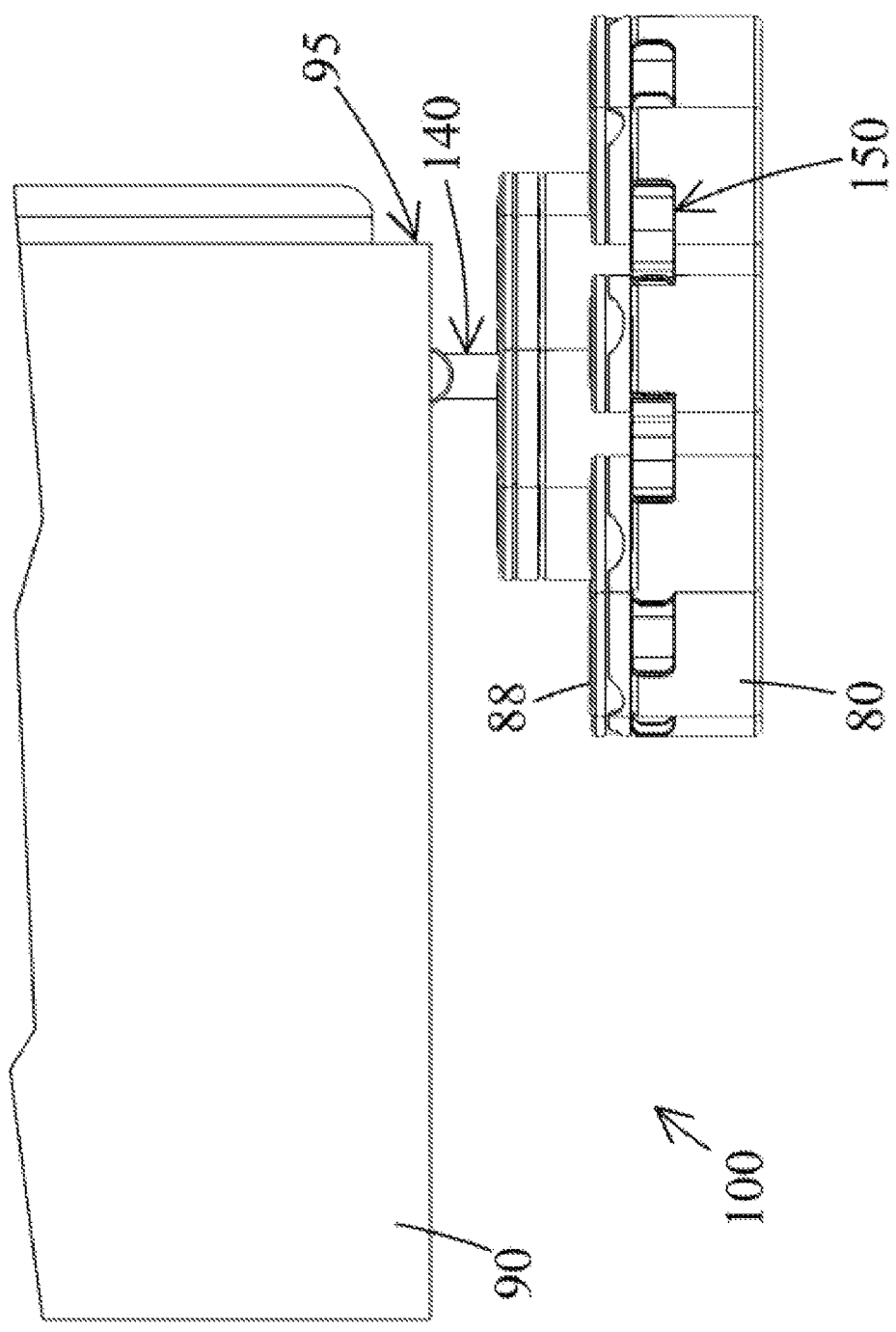
FIG. 8 is a side view of the storage system components of FIG. 1 laden with kitchen spice jars, secured to the bottom side of a wall cabinet, and occupying a more accessible configuration relative to the cabinet.
Figure 9:
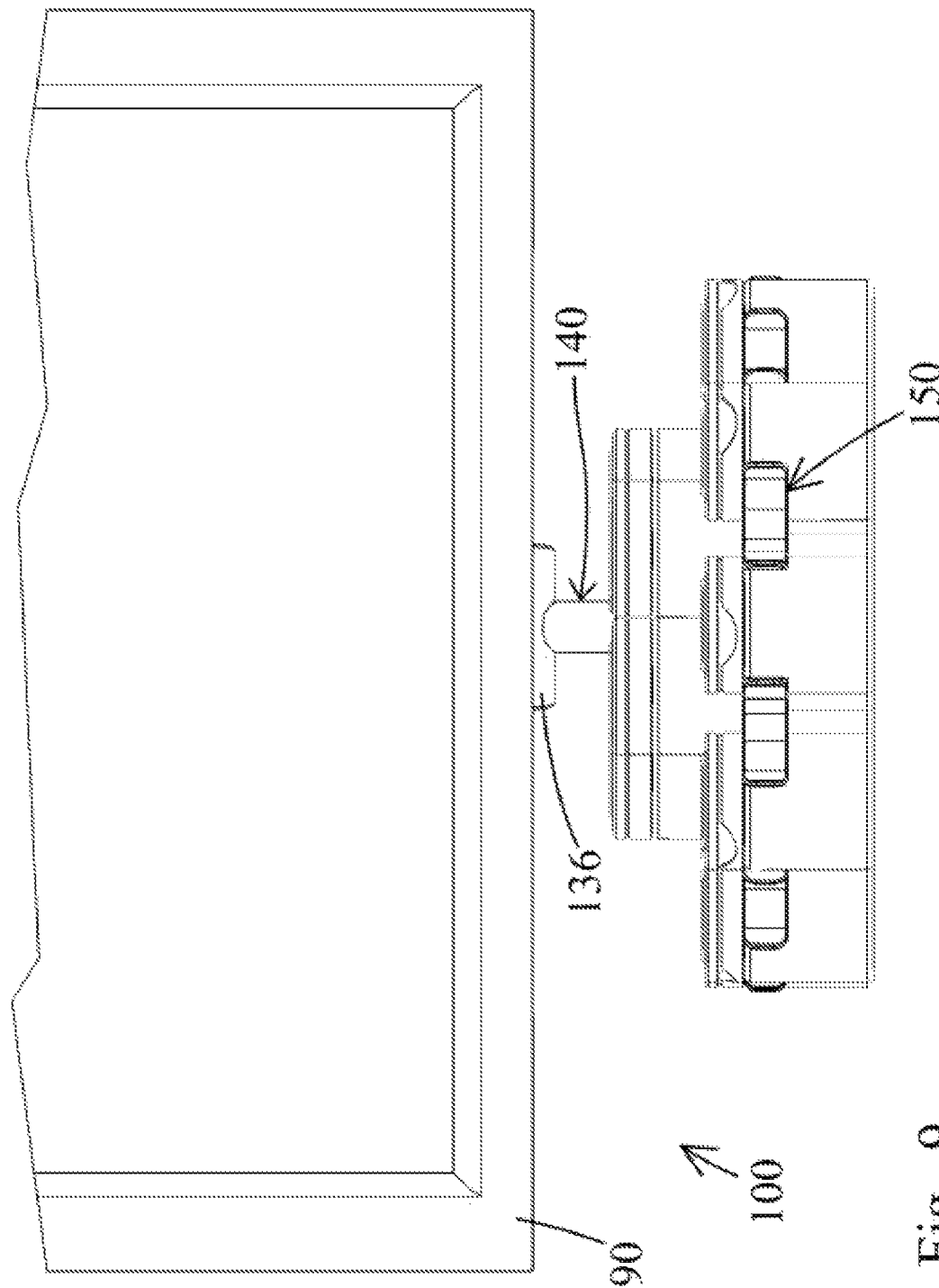
FIG. 9 is a front view of the laden and more accessible storage system of FIG. 8.

FIGS. 6-7 show the carousel 150 occupying a stowed position relative to the cabinet 90, with the axle 140 occupying the rear recess 132 along the track, and the entire carousel 150 disposed rearward of the front edge 95 of the cabinet 90. FIGS. 8-9 show the carousel 150 occupying a deployed or more accessible position relative to the cabinet 90, with the axle 140 occupying the front recess 131 along the track, and a portion of the carousel 150 disposed forward of the front edge 95 of the cabinet 90. Also, the carousel 150 is disposed a first vertical distance beneath the cabinet 90 in FIGS. 6-7, and the carousel occupies a relatively greater, second distance beneath the cabinet 90 in FIGS. 8-9. Depending on various factors including cabinet design, installation parameters, and spice jar sizes, this change in elevation may allow the tops of the spice jars to move between a rearward position upward and behind the front edge of the cabinet and a forward position downward and below the front edge of the cabinet.

Figure 10:
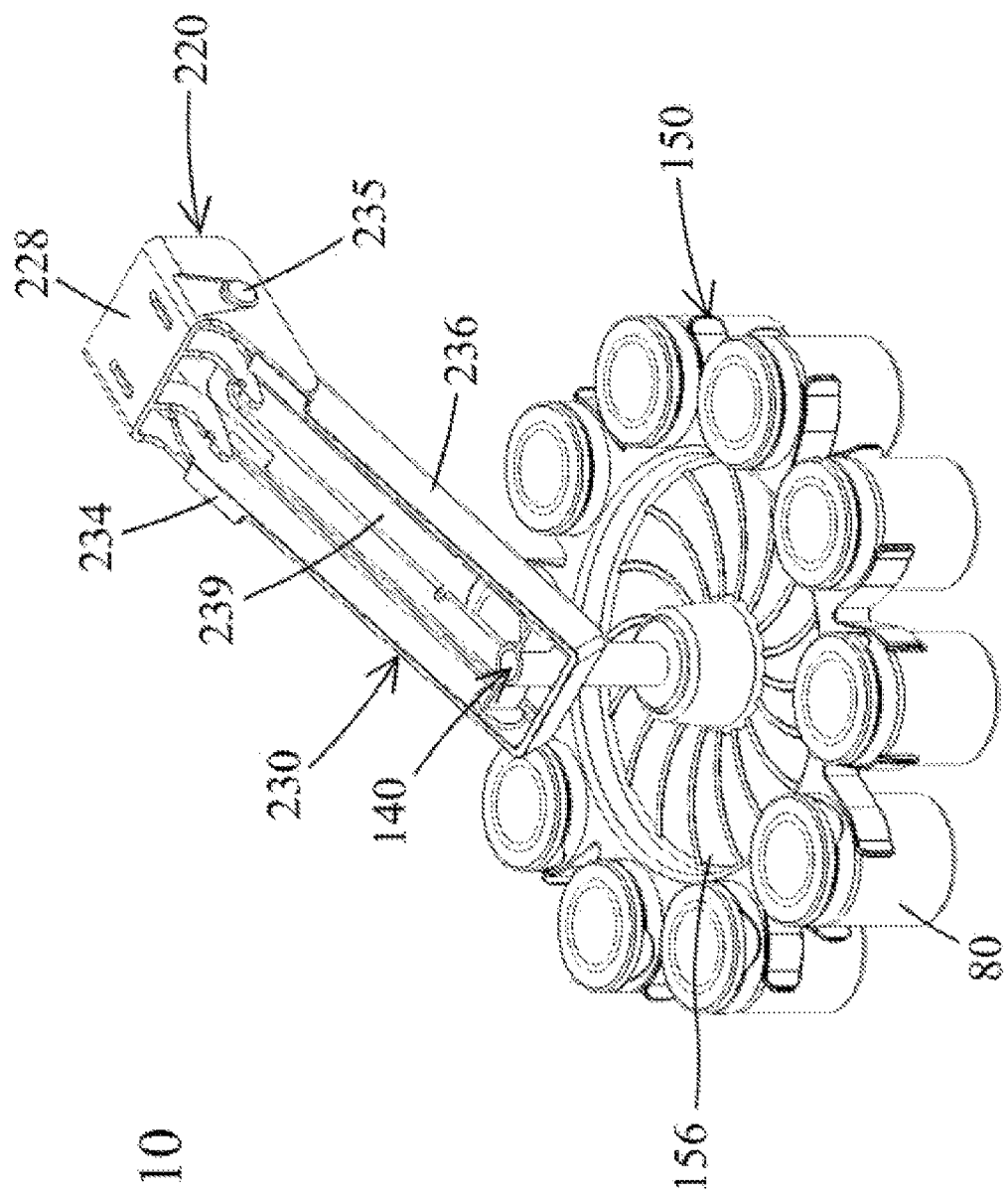
FIG. 10 is a perspective view of components of another storage system constructed according to the principles of the present invention and laden with spice jars.
Figure 11:
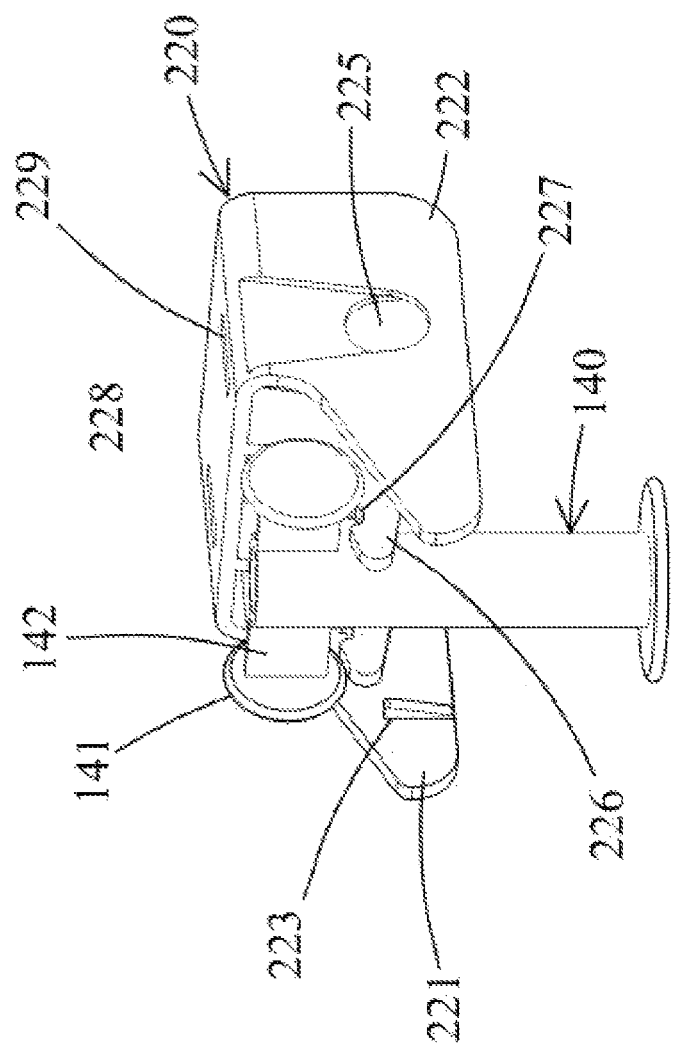
FIG. 11 is another perspective view of two of the components shown in FIG. 10.

FIGS. 10-11 show components of another storage system constructed according to the principles of the present invention and laden with some of the same spice jars 80. The central tray 156 is left vacant to emphasize that items other than jars may be stored in this space. As suggested by the common reference numerals the carousel 150 and the axle 140 are the same as those shown in FIGS. 1-4. However, the bracket 110 has been replaced with an alternative embodiment bracket having a first portion that defines a base 220 and a second portion that defines a track 230. Each of the bracket components 220 and 230 is preferably a separate, injected molded plastic part that is manufactured using a relatively simple two-piece mold and a single direction of pull.

The base portion 220 includes a top wall 228 having respective top and bottom surfaces that are bounded by common first and second parallel planes. In other words, the top surfaces of the top wall 228 are configured and arranged to rest flush against a flat surface, such as the downwardly facing side of a horizontal board. Holes 229 extend through opposite end portions of the top wall 228 to accommodate insertion of the shafts of fasteners, such as conventional wood screws, for example, but resist passage of the heads of those fasteners. In other words, conventional wood screws (not shown) may be inserted into the holes 229 from the bottom side of the top wall 228 and then threaded into an overlying board in order to rigidly secure the base portion 220 to the board.

The base portion also includes opposing left and right sidewalls 221 and 222 that extend perpendicularly downward from respective ends of the top wall 228. Aligned circular holes 225 extend through respective sidewalls 221 and 222. Relatively lower portions of the sidewalls 221 and 222 extend forward beyond a forward edge of the top wall 228 and function as leaf springs, and opposing, upwardly expanding, wedge-shaped tabs 223 are disposed on forward portions of the leaf springs. Also, opposing left and right flanges 226 project downward from respective intermediate portions of the top wall 228 and then forward beyond a forward edge of the top wall 228, and upwardly opening notches 227 extend downward into the forward portions of respective flanges 226. As shown in FIG. 11, the tabs 142 on the axle 140 are moveable to a position in overlying vertical alignment with the notches 227. As a result, the axle 140 (together with the carousel 150) can be selectively retained in place on the flanges 226 and suspended therefrom (independent of the track portion 230).

The track portion 230 is defined by a chute-like structure or shell 236. Proximate the rearward end of the shell 236, left and right tabs project rearward and function as leaf springs. Cylindrical nubs or buttons 235 project outward from outboard sides of respective tabs on the shell 236 and snap into respective holes 225 in the base portion 220. The nubs 235 cooperate with the holes 225 to pivotally connect the track portion 230 to the base portion 220 for pivoting about a horizontal axis.

Proximate the rearward end of the shell 236, left and right flanges 234 project laterally outward from respective sidewalls of the shell 236. These flanges 234 rest on top of respective sidewalls 221 and 222 of the base portion 220 when the track portion 230 is pivoted twenty-five degrees from horizontal relative to the base portion 220. In other words, the sidewalls 221 and 222 supported the weight of the track portion 230, the axle 140, and the carousel 150 when the track portion 230 is pivoted downward twenty-five degrees out of parallel with the top wall 228. When the track portion 230 is pivoted into a parallel orientation relative to the top wall 228 (and horizontal), portions of the shell 236 encounter the tabs 223 on the base portion 220, cause the sidewalls 221 and 222 to spread apart, and then bottom portions of the shell 236 clear the tabs 223 and come to rest on the tabs 223 as the sidewalls 221 and 222 flex back toward one another.

The bottom of the shell 236 is defined by parallel left and right rails separated by an elongate slot 239 disposed therebetween and extending parallel thereto. The slot 239 and the rails function in much the same manner as those on the track portion 130 described with reference to FIGS. 1-4, except that there are no dips at the ends of the track defined thereby. Also, similar pairs of opposing notches 133 extend laterally into opposing, inwardly facing sides of the rails. Because of the pivoting track portion 230, the notches 133 allow the axle 140 to be installed and removed relative to the track portion 230 regardless of whether or not the base portion 220 is installed.

Figure 12:
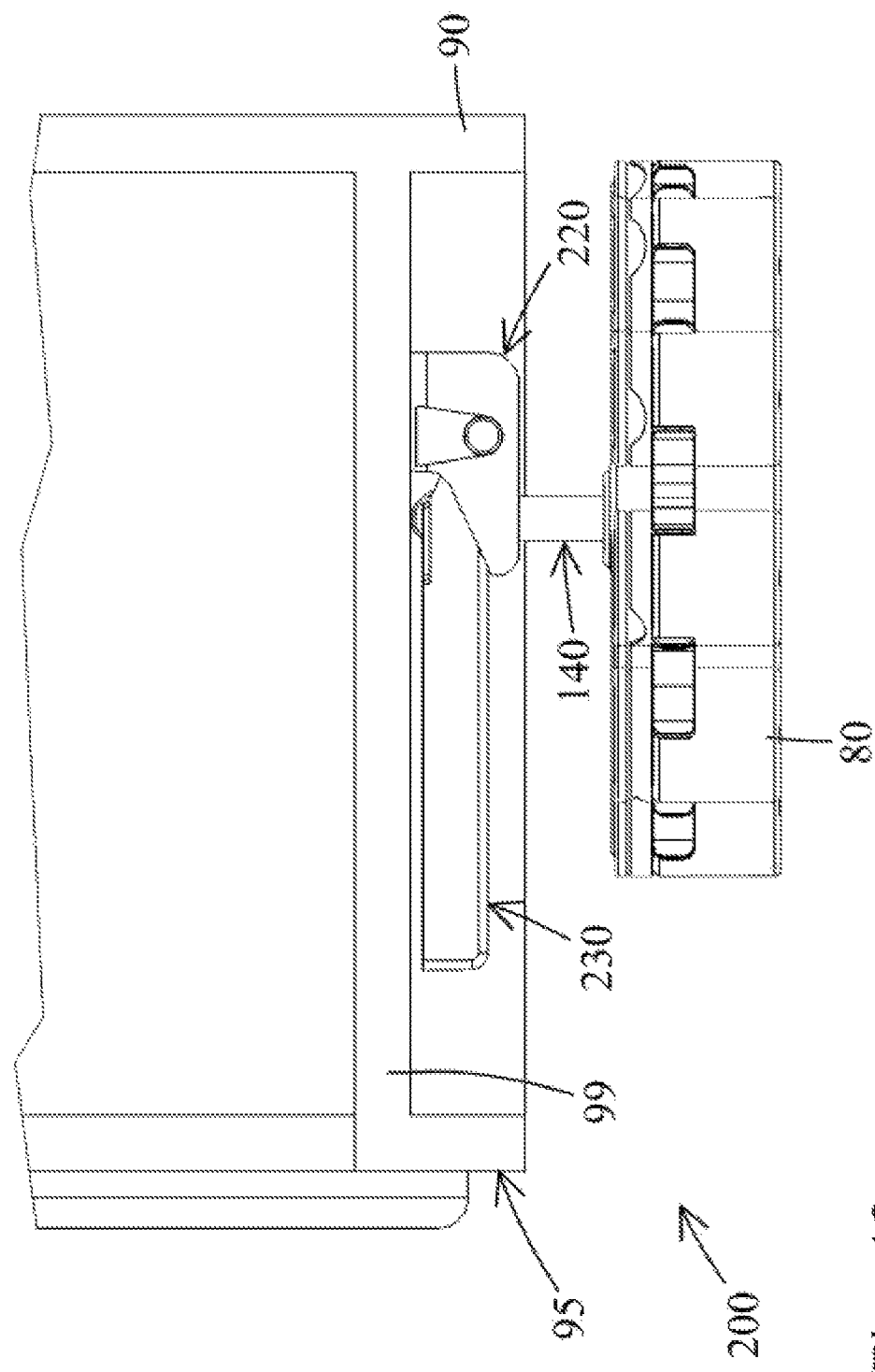
FIG. 12 is a side view of the storage system components of FIG. 10 secured to the bottom side of a wall cabinet (having a side panel removed), and occupying a stowed configuration relative to the cabinet.
Figure 13:
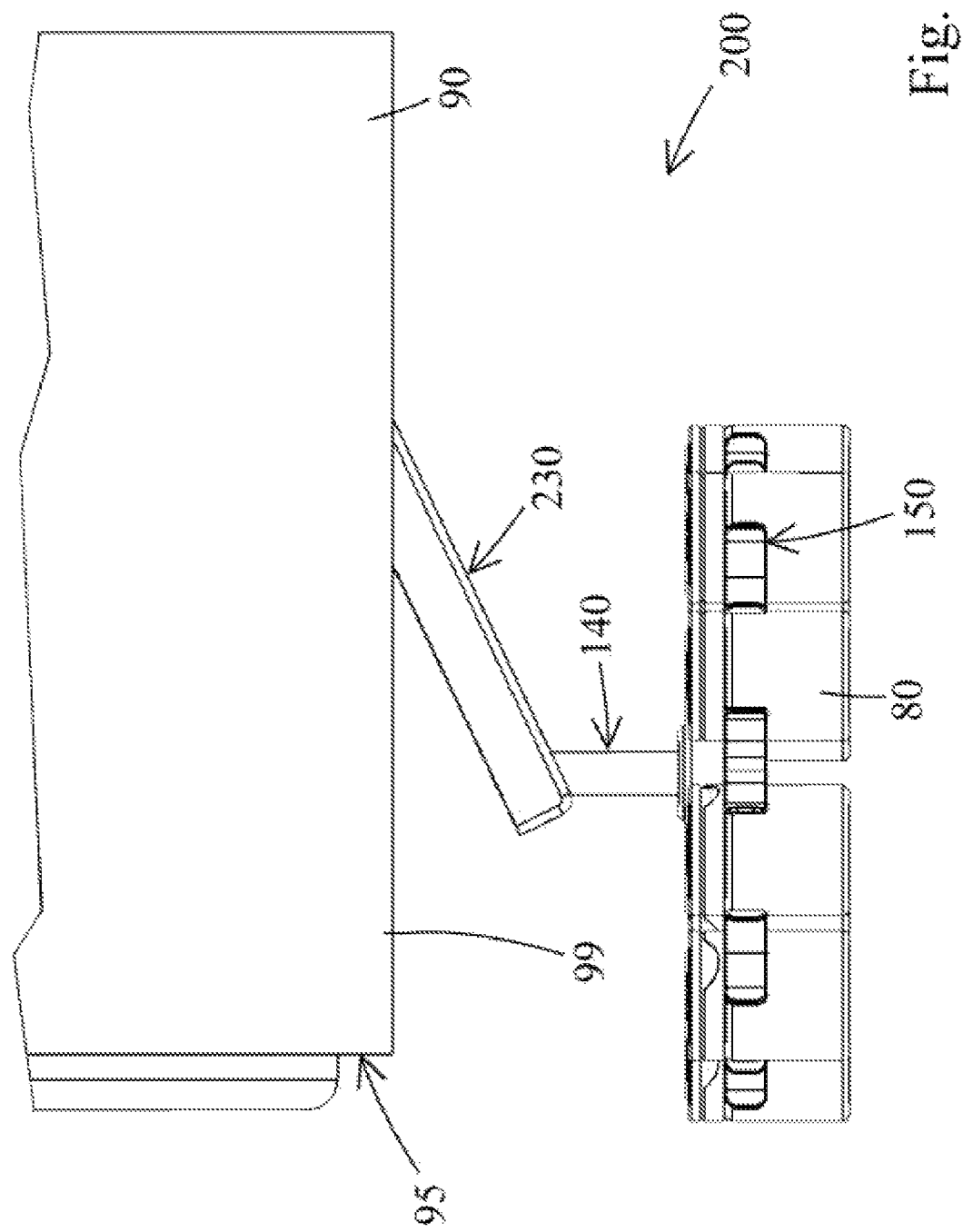
FIG. 13 is a side view of the storage system components of FIG. 10 secured to the bottom side of a wall cabinet, and occupying a more accessible configuration relative to the cabinet.

FIGS. 12-13 show the components of FIGS. 10-11 installed beneath an otherwise conventional kitchen cabinet 90 to define an installed storage system 200. The cabinet 90 includes a bottom shelf or board 99 that extends horizontally across the bottom of the cabinet 90, and is bounded by first and second horizontal planes. The depth of the cabinet 90 is approximately one foot. Conventional wood screws (not shown) are inserted through the holes 229 in the base portion 220, and threaded into the bottom of the board 99, to fasten the bracket 220 to the bottom side of the board 99. Persons skilled in the art will recognize that the base portion 220 may alternatively be installed beneath an upper shelf disposed inside the cabinet 90, or beneath a simple horizontal shelf not associated with any cabinetry, for example.

FIG. 12 shows the track portion 230 and the carousel 150 occupying a stowed position relative to the cabinet 90, with the track portion 230 extending parallel to the board 99 and the top wall 228 on the base portion 220, and the entire carousel 150 disposed rearward of the front edge 95 of the cabinet 90. FIG. 13 shows the track portion 230 and the carousel 150 occupying a deployed or more accessible position relative to the cabinet 90, with the track portion 230 tilted twenty-five degrees relative to the board 99 and the top wall 228 of the base portion 220, and a portion of the carousel 150 disposed forward of the front edge 95 of the cabinet 90. Also, the carousel 150 is disposed a first vertical distance beneath the cabinet 90 in FIG. 12, and the carousel occupies a relatively greater, second distance beneath the cabinet 90 in FIG. 13 (and the vertical travel is many times greater than that achieved by the components shown in FIGS. 1-4). Depending on various factors including cabinet design, installation parameters, and spice jar sizes, this change in elevation may allow the tops of the spice jars to move between a rearward position upward and behind the front edge of the cabinet and a forward position downward and below the front edge of the cabinet.

Different sorts of track defining arrangements may be used without departing from the scope of the subject invention. For example, the track portion may define a single beam or mono-rail having an I-shaped or inverted T-shaped profile, in which case a C-shaped traveler may be mounted on top of the axle to travel along the lower portion thereof. Alternatively, the track portion may define a single beam or mono-rail having a J-shaped profile, in which case an inverted J-shaped traveler may be mounted on top of the axle to travel along the lower portion thereof. An advantage of slotted tracks is that they can be configured to accommodate rotation of an alternative embodiment axle relative thereto. For example, an alternative embodiment slotted track may terminate in a forward end that defines an upwardly opening cylindrical recess, and an alternative embodiment axle may have a top end configured as a vertically oriented cylinder that drops into the recess and rotates therein. Of course, persons skilled in the art will also recognize that the monorail embodiments discussed above can accommodate a two-part axle having an upper portion and a lower portion that are rotatably interconnected to one another. In other words, rotation of the carousel relative to the track may be accomplished in various ways, including rotatably connecting the carousel to the axle, rotatably connecting the axle to the track, and/or dividing the axle into upper and lower sections that rotate relative to one another.

FIGS. 14-17 show components of another storage apparatus 400 constructed according to the principles of the present invention and laden with some of the same conventional spice jars 80. The storage apparatus 400 includes a support structure or bracket 410 (shown by itself in FIG. 17) and a container supporting member (or rack) 420, both of which are preferably injection molded plastic parts that are manufactured using relatively simple two-piece molds with a single direction of pull.

As best seen in FIG. 17, the bracket 410 has an upper end or base portion 411 that is configured and arranged to be secured in a fixed orientation beneath a structural member (e.g. the bottom wall of a shelf or a conventional kitchen cabinet 90) and/or to define a vertical axis X (see FIG. 15) beneath any such structural member. On the preferred embodiment, two sets of three openings or notches 412 in the base 411 open outward in opposite directions from a central parting plane to accommodate screws 92 that may be threaded upward into the downwardly facing bottom wall of the cabinet 90. Different combinations of two to six screws 92 may be used to secure the bracket 410 in place.

The bracket 410 has a lower end (or catch) 413 that may be described as an inverted generally V-shaped spring defined by opposite first and second leaf springs or prongs 414 (which are mirror images of each other). The prongs 414 occupy diametrically opposite locations relative to the axis X, and upper tabs 415 and lower tabs 416 project generally radially outward from respective prongs 414 for reasons discussed below.

Figure 14:
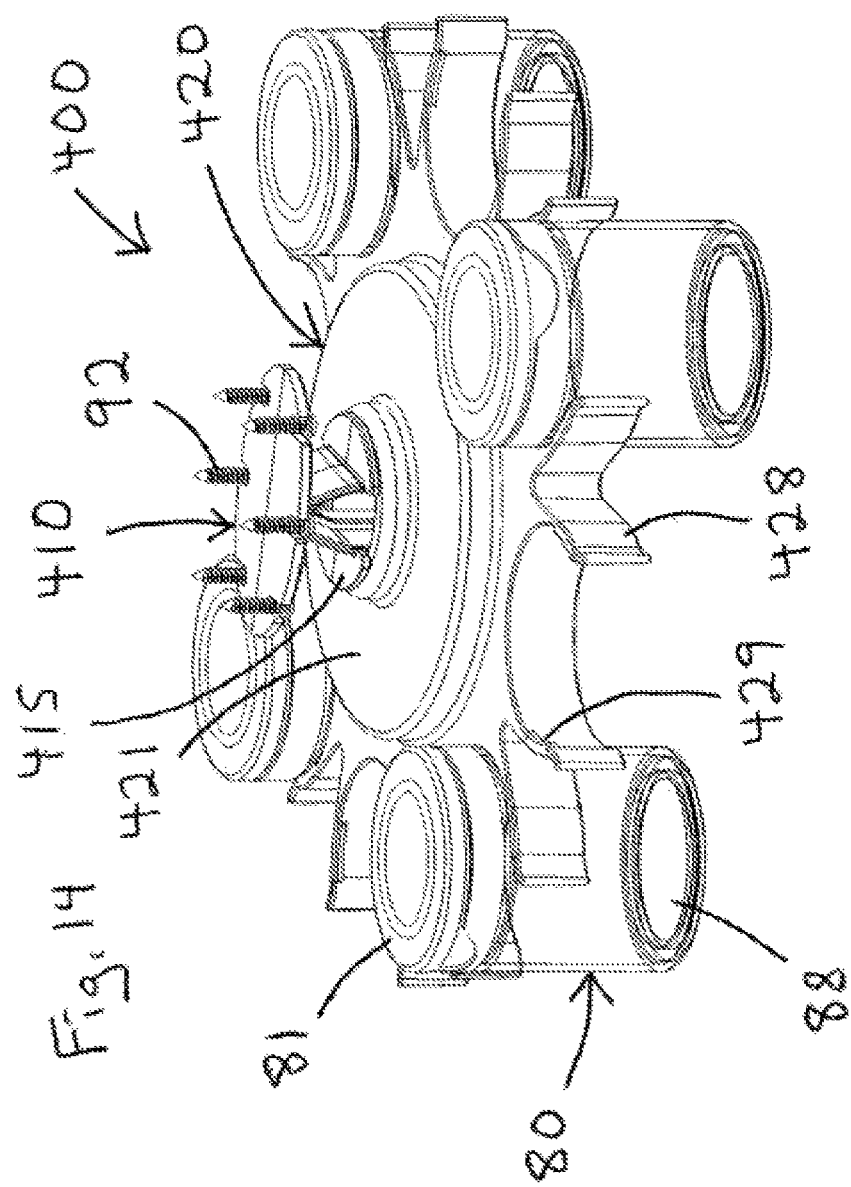
FIG. 14 is a perspective view of another storage apparatus constructed according to the principles of the present invention.
Figure 16:
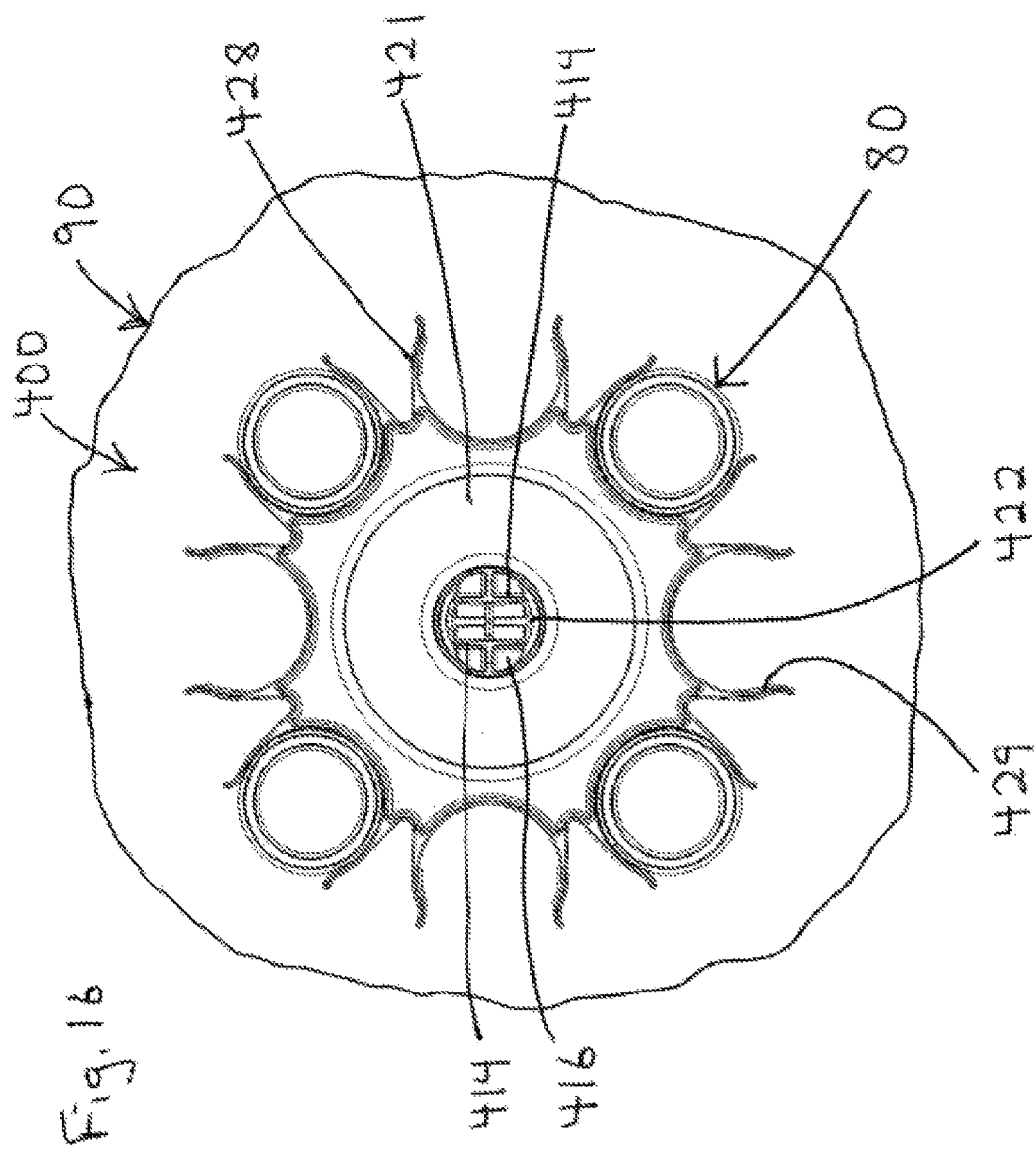
FIG. 16 is a partially fragmented bottom view of the storage apparatus and cabinet shelf of FIG. 15.

As best seen in FIGS. 14 and 16, the rack 420 includes a central portion 421 and eight circumferentially spaced pairs of opposing leaf springs (or C-shaped clips) 428 projecting outward from the central portion 421. Inwardly projecting tabs or ribs 429 are preferably provided on the leaf springs 428 for reasons discussed below.

As shown in FIG. 16, a centrally located circular hole 422 extends through the central portion 421, and the prongs 414 on the bracket 410 project through the hole 422 to rotatably support the rack 420. The prongs 414 and 415 resiliently deflect toward one another to accommodate passage through the hole 422, and resiliently deflect away from one another to resist passage through the hole 422. As shown in FIG. 16, the lower tabs 416 on the prongs 414 bear against a downwardly facing portion of the central portion of the rack 420, and as shown in FIG. 14, the upper tabs 415 on the prongs bear against an upwardly facing portion of the central portion 421. The tabs 415 and 416 stabilize the rack 420 (in a horizontal orientation beneath the shelf), and the intermediate portions of the prongs 414 cooperate with the circular hole 422 to accommodate rotation of the rack 420 relative to the bracket 410.

Figure 15:
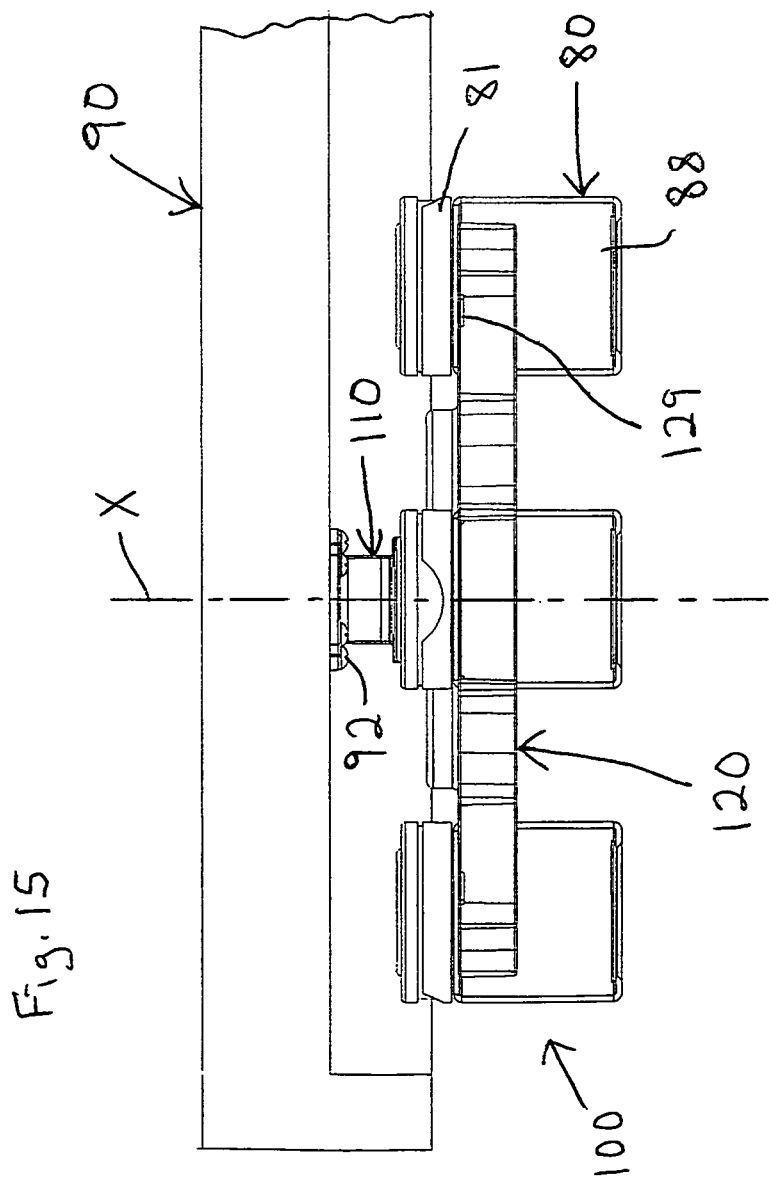
FIG. 15 is a partially fragmented side view of the storage apparatus of FIG. 14 mounted on the downwardly facing side of a cabinet bottom or shelf.

FIGS. 14-16 show conventional kitchen spice jars 80 positioned in every other container holder or clip 428 (with the understanding that four additional jars 80 may be positioned in the unoccupied clips 428). Each jar 80 includes an upper lid portion 81 and a lower jar portion 88. The tabs 429 preferably snap into small gaps defined between the bottom of the lid portion 81 and the top of the jar portion 88, but the clips 428 are also capable of functioning without the tabs 429 fitting into the gaps or without any tabs 429 disposed on the clips 428.

Persons skilled in the art will recognize that alternative embodiments of the invention may include different sorts of receptacles instead of the spice jars 80 and/or different sorts of containers (and accompanying receptacles). For example, leaf spring clips may be arranged to act upon relatively more elongate containers that extend longitudinally in respective radial directions away from the axis X. On other embodiments, the receptacles may be configured as cups having sidewalls and a bottom wall, as opposed to leaf springs.

Persons skilled in the art will also recognize that components and/or features of the foregoing embodiments may be mixed and matched to arrive at additional embodiments, and/or that terminology used to describe components of one embodiment may be used to describe one or more components of other embodiments. For example, the rack 420 may be described as a wheel or a carousel and/or may be substituted for the wheel or carousel on another embodiment (by also modifying the lower end of the axle to match the lower end of the bracket 410 and engage the rack 420 in the same manner as the bracket 410 does). In other words, the upper end of the bracket 410 could be modified to slide along a track on another embodiment, in which case the support structure could be described as both a base member and an axle that slides along the base member.

The invention may also be described in terms of storage methods with reference made to one or more embodiments. One such method comprises the steps of providing a storage apparatus for items disposed inside respective containers having upper lid portions and lower jar portions, for use beneath a shelf, wherein the storage system includes a support structure and a rack; mounting the support structure to a downwardly facing surface defined by the shelf; positioning the containers in respective dedicated locations defined by the rack; and resiliently mounting the rack onto the support structure in such a manner that at least one of the rack and the support structure resiliently deflects to accommodate mounting and dismounting of the rack relative to the support structure. The storage method may further comprise the step of selectively rotating the rack relative to the support structure to alternatively move discrete containers to a relatively forwardmost position relative to the shelf.

The present invention has been described with reference to particular embodiments and specific applications. However, this disclosure will enable persons skilled in the art to derive additional modifications, improvements, and/or applications that nonetheless embody the essence of the invention. For example, persons skilled in the art will recognize that features of the many embodiments shown and/or described herein (and/or obvious substitutions therefor) may be interchanged with features on other embodiments, as well as mixed and matched in various combinations, to arrive at still more embodiments of the present invention. In view of the foregoing, the scope of the present invention is to be limited only to the extent of the following claims.

What is claimed is:

1. A storage system for use beneath a shelf, comprising:
a support structure having (a) a first end configured and arranged to occupy an orientation that defines a vertical axis beneath the shelf, and (b) an opposite, second end including at least one prong; and
a rack having a central portion and circumferentially spaced container holders disposed about the central portion, wherein a centrally located hole extends through the central portion of the rack, and the at least one prong occupies the hole to releasably mount the rack on the support structure, and the at least one prong resiliently deflects (a) toward the axis to accommodate passage through the hole and (b) away from the axis to resist passage through the hole, wherein upper and lower tabs extend generally radially outward from the at least one prong and retain the rack therebetween.

2. The storage system of claim 1, wherein the at least one prong includes diametrically opposed first and second prongs.

3. The storage system of claim 2, wherein first and second pairs of said upper and lower tabs extend generally radially outward from respective said first and second prongs and retain the rack therebetween.

4. The storage system of claim 3, wherein the hole is circular and accommodates rotation of the rack relative to the support structure when the rack is mounted on the prongs.

5. The storage system of claim 4, further comprising a plurality of containers releasably retained in respective ones of the container holders on the rack.

6. The storage system of claim 5, wherein each of the containers includes an upper lid portion and a lower jar portion, and each of the container holders defines a C-shaped clip that engages a respective one of the containers between the lid portion and the jar portion.

7. The storage system of claim 6, wherein the first end of the support structure defines openings that receive respective mounting screws.

8. The storage system of claim 1, wherein the hole is circular and accommodates rotation of the rack relative to the support structure when the rack is mounted on the at least one prong.

9. The storage system of claim 1, further comprising a plurality of containers releasably retained in respective ones of the container holders on the rack, wherein each of the containers includes an upper lid portion and a lower jar portion, and each of the container holders defines a C-shaped clip that engages a respective one of the containers between the lid portion and the jar portion.

10. A storage method, comprising the steps of:
providing a storage apparatus for items disposed inside respective containers having upper lid portions and lower jar portions, for use beneath a horizontal shelf, wherein the storage apparatus includes a support structure and a rack;
mounting the support structure to a downwardly facing surface defined by the shelf to define a vertical axis and a downwardly extending member that is accessible from below;
positioning the containers in respective dedicated locations defined by the rack; and
resiliently snap-fitting the rack onto the support structure by (a) positioning the rack beneath the member, (b) vertically aligning the rack with the member, and (c) moving the rack upward onto the member until a tab on the member underlies the rack, thereby latching the rack in place on the support structure.

11. The storage method of claim 10, further comprising the step of selectively rotating the rack about the axis to alternatively move discrete ones of the containers to a relatively forwardmost position relative to the shelf.

12. The storage method of claim 10, further comprising the step of selectively removing the rack from the support structure by (a) pushing the member toward the axis, (b) pulling the rack downward off the member, and (c) moving the rack out of vertical alignment with the member.

13. The storage method of claim 10, wherein the member includes a first prong and a second prong, and the moving step involves moving the rack upward onto the member until a separate said tab on each said prong underlies the rack, thereby latching the rack in place on the support structure.

14. The storage method of claim 13, wherein the moving step squeezes the first prong and the second prong toward one another.

15. A storage system for use beneath a shelf, comprising:
a support structure configured and arranged to be mounted on the shelf in a manner that defines a downwardly extending member that is accessible from below; and
a rack having a central portion and circumferentially spaced container holders disposed about the central portion, wherein the rack is movable between a first position, wherein the central portion is resiliently latched in place on the member, and a second position, wherein the central portion is free of the member and the rack is directly beneath the support structure, wherein first and second tabs project laterally outward from the member and releasably retain the central portion of the rack in the first position.

16. The storage system of claim 15, wherein the member includes opposing first and second prongs that resiliently deflect toward one another to accommodate passage of the rack onto the member and off of the member.

17. The storage system of claim 15, wherein the member cooperates with the central portion of the rack to define a vertical axis, and the rack is rotatable about the axis relative to the support structure.

18. The storage system of claim 15, wherein the member cooperates with the central portion of the rack to define a vertical axis, and the first position and the second position are at discrete locations along the axis.

19. The storage system of claim 18, wherein the rack is rotatable about the axis when occupying the first position.

* * * * *